United States Patent [19]

Korwill

[11] 4,416,256
[45] Nov. 22, 1983

[54] SOLAR WATER HEATERS

[75] Inventor: Ferdinand C. Korwill, Dalkeith, Australia

[73] Assignee: S. W. Hart & Co. Pty. Ltd., Welshpool, Australia

[21] Appl. No.: 240,672

[22] Filed: Mar. 5, 1981

[30] Foreign Application Priority Data

Mar. 6, 1980 [AU] Australia .................................. PE2664

[51] Int. Cl.$^3$ ................................................ F24J 3/02
[52] U.S. Cl. .................................... 126/427; 126/419; 126/437; 126/374
[58] Field of Search ............... 126/419, 421, 437, 427, 126/374; 236/24; 165/39, 485; 137/468; 122/20 B

[56] References Cited

U.S. PATENT DOCUMENTS

| 886,100 | 4/1908 | Walker | 236/34 |
| 2,007,714 | 7/1935 | Gauger | 236/24 X |
| 2,814,279 | 11/1957 | Thomas | 126/362 X |
| 4,157,706 | 6/1979 | Gaskill | 126/435 |

Primary Examiner—Larry Jones
Attorney, Agent, or Firm—Pollock, Vande Sande & Priddy

[57] ABSTRACT

The present invention provides a solar heater which comprises a water storage tank having a cold water inlet and a hot water outlet, an instantaneous gas fired water heater operatively connected to the hot water outlet of the water storage tank, a first, flow control valve arranged to allow gas to be fed to the gas fired water heater in response to water flow through the hot water outlet, a second, thermostatically controlled valve arranged to allow gas to be fed to the gas fired water heater in response to the temperature of the water in the hot water outlet, and a thermostat arranged to cause the second valve to open when the water in the hot water outlet is at or below a predetermined minimum temperature and to cause the second valve to close when the water in the hot water outlet reaches a predetermined maximum temperature, the arrangement being such that the gas fired water heater is only activated when both the valves are open.

5 Claims, 1 Drawing Figure

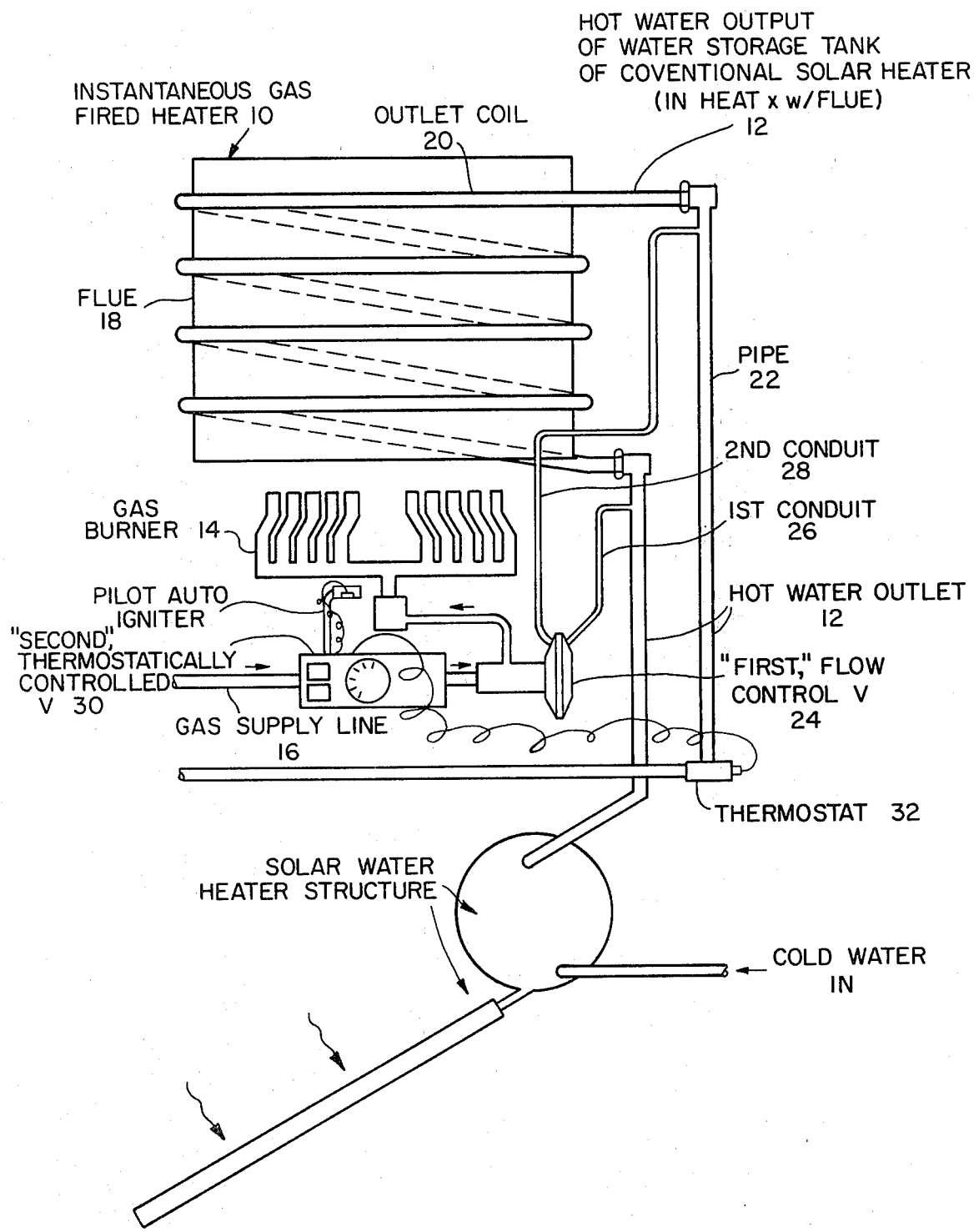

SOLAR WATER HEATERS

The present invention relates to a solar water heater. Solar water heaters typically comprise a water storage tank arranged to store heated water until it is required for use. The water is heated directly or indirectly by solar radiation impinging on an absorber plate and heating a liquid in the absorber plate. The liquid in the absorber plate may be the water which is subsequently stored in the storage tank, or it may be another liquid which is used to transfer heat to water in the storage tank.

During periods of little or no solar radiation the solar contribution to heating of the water int eh storage tank is insufficient. Thus, many solar water heaters incorporate an electric booster which maintains the temperature of the water in the storage tank at a desired level in the event that the solar heating effect is not sufficient. Typically, the electric booster is thermostatically controlled and will operate at all times that the temperature of the water in the storage tank falls below the desired level. Thus, for example, during the night when the demand for hot water is very low, the electric booster will still operate to heat the water when the temperature falls below the desired level.

The present invention provides a solar water heater in which the aforementioned problem is overcome by using an instantaneous gas fired water heater in place of the electric booster. In accordance with the present invention, there is provided a solar water heater unit which comprises a water storage tank having a cold water inlet and a hot water outlet, an instantaneous gas fired water heater operatively connected to the hot water outlet of the water storage tank, a first, flow control valve arranged to allow gas to be fed to the gas fired water heater in response to water flow through the hot water outlet, a second, thermostatically controlled valve arranged to allow gas to be fed to the gas fired water heater in response to the temperature of water in the hot water outlet, and a thermostat arranged to cause the second valve to open when the water in the hot water outlet is at or below a predetermined minimum temperature and to cause the second valve to close when the water in the hot water outlet reaches a predetermined maximum temperature, the arrangement being such that the gas fired water heater is only activated when both the valves are open.

In the apparatus of the present invention, gas is not supplied to the instantaneous gas fired water heater until such time as there is sufficient water flow through the hot water outlet. Thus, the gas fired water heater is only brought into operation when sufficient water is passing through it. Further, if the water flow through the hot water outlet is above the predetermined minimum temperature, the thermosostatically controlled valve will remain closed and gas will not be supplied to the gas fired water heater, and the gas fired water heater will not be brought into operation. On the other hand, if the water temperature is at or below the predetermined minimum temperature, the thermostatically controlled valve will open and allow gas supply to the gas fired water heater. Thus, the gas fired water heater will be brought into operation and will continue in operation until the temperature of the water reaches the predetermined maximum temperature.

If this point is reached, the thermostatically controlled valve closes automatically and reduces the gas supply to maintain the predetermined temperature. If this temperature is exceeded, the valve closes automatically and cuts off the gas supply. In a solar water heater it is especially important to sense both minimum and maximum temperatures, since the water flowing from the water storage tank will be of varying temperature depending on the degree of solar contribution, which can vary from low to very high levels. The amount of boost required varies accordingly.

The use of the gas fired instantaneous water heater eliminates the need for boosting while water is in the storage tank. Also, the size of the storage tank can be reduced.

The present invention will now be described, by way of example, with reference to the accompanying drawing which is a schematic side elevation of an instantaneous gas fired water heater which may be used in the present invention.

The instantaneous gas fired water heater 10 is arranged to be connected to the hot water outlet 12 of a water storage tank of a conventional solar water heater (not shown). In known manner, the solar water heater comprises an absorber plate arranged to receive solar radiation and the water storage tank which is arranged to store water heated as a result of the impingement of solar radiation on the absorber plate. The water storage tank comprise a cold water inlet (not shown) and the hot water outlet 12. When hot water is required by a user it is drawn through the hot water outlet 12 and the withdrawn hot water is replaced by fresh cold water flowing in through the cold water inlet.

The gas fired water heater 10 comprises a gas burner 14 which is connected to a gas supply line 16. The water heater 10 also comprises a flue 18 above the gas burner 14. Hot combustion products from the gas burner 14 pass through the flue 18 and cause it to become heated.

Further, the hot water outlet 12 passes externally around the flue 16 in heat exchange relation therewith. As shown, the hot water outlet 12 is arranged around the flue 18 in the form of a coil 20 to assure good heat transfer in use. Downstream of the coil 20 the hot water outlet 12 is in the form of a pipe 22 which leads to a system for supply of hot water to points of use.

The gas supply line 16 comprises two valves. Firstly, there is a flow control valve 24. The flow control valve 24 is connected to a first conduit 26 which branches from the hot water outlet 12 upstream of the coil 20 and a second conduit 28 which is connected to the pipe 22 of the hot water outlet 12 downstream of the coil 20. When water flows through the hot water outlet 12 a small amount of the water also flows through the conduit 26 into the valve 24 and then through the conduit 28 into the pipe 22. This flow causes the flow control valve 24 to open and allow gas to be supplied from the line 16 to the burner 14.

However, the gas supply line 16 also comprises a second, thermostatically controlled valve 30 which is located in the line 16 upstream of the valve 24. The valve 30 is electrically connected to a thermostat 32 in the pipe 22. The thermostat 32 is arranged to sense the temperature of the water in the pipe 22. When the temperature of the water flowing through the pipe 22 is above a predetermined minimum temperature, such as in the range from about 45° to 55° C., the thermostat 32 sends a signal to the valve 30 which keeps it closed. Thus, no gas is supplied to the gas burner 16. However, when the temperature of the water flowing through the pipe 22 is at or below the predetermined minimum temperature, the thermostat sends a signal to the valve 30 which causes it to open. Thus, where there is a combination of water flow in the pipe 22 and the water has a temperature within a particular range, gas will be supplied to the burner 14. The burner 14 comprises auto ignition means of known type, such as a pilot light. The gas supplied to the burner 16 is ignited and combusted.

It is necessary to reduce or stop operation of the gas burner 14 at a predetermined maximum temperature, such as in the range from about 55° to 65° C. as otherwise the water in the hot water outlet 12 could be caused to boil. Further, since the water in the hot water outlet 12 would be of varying temperature, depending on the degree of solar contribution, the precise amount of heat input that may be required from the burner 16 cannot be predicted in advance. Thus, some cut off means has to be provided to reduce the gas flow to maintain the water at the predetermined maximum temperature, or, if necessary, to stop the gas flow altogether.

When hot water is required for use, it is caused to flow from the water storage tank through the hot water outlet 12. The flow control valve 24 opens and the thermostat 32 senses the temperature of the water. If the temperature is at or below the predetermined minimum temperature, the valve 30 opens and gas is admitted to the burner 14. The gas is auto ignited and combusted and the hot combustion products heat the flue 18. Heat is thus transferred to water passing through the coil 20. This, process continues until the water flow is shut off or the water in the pipe 22 reaches the predetermined maximum temperature. In the latter event, the gas supply is reduced to maintain the water temperature in the pipe 22 at the predetermined maximum temperature. If the temperature of the water exceeds the predetermined maximum temperature, the gas supply is stopped altogether until the temperature falls below the predetermined minimum temperature, at which point gas supply can be resumed.

Modifications and variations such as would be apparent to a skilled addressee are deemed within the scope of the present invention. For example, the coil 20 could be modified by including a portion overlying the flue 18 for more efficient heat transfer.

I claim:

1. A solar water heater comprising
  (a) a water storage tank having a cold water inlet pipe and a hot water outlet pipe;
  (b) an instantaneous gas fired water heater operatively connected to said hot water outlet pipe and comprising a gas burner;
  (c) a gas supply line to said gas burner;
  (d) means for auto-igniting said gas burner;
  (e) a flow control valve located in said gas supply line and arranged to allow gas to be fed to said gas fired water heater in response to water flow through said hot water outlet;
  (f) a thermostatically controlled valve located in said gas supply line and arranged to allow gas to be fed to said gas fired water heater in response to the temperature of the water in said hot water outlet pipe; and
  (g) a thermostat mounted in said hot water outlet pipe downstream of said gas fired water heater and arranged to cause said thermostatically controlled valve to open when the water in said hot water outlet pipe downstream of said gas fired water heater is at or below a predetermined minimum temperature and to cause said thermostatically controlled valve to close partially or completely so as to reduce or eliminate the amount of gas which can flow therethrough when the water in said hot water outlet reaches a predetermined maximum temperature, whereby gas flows to said gas fired water heater only when both said flow control valve and said thermostatically controlled valve are open.

2. A solar water heater according to claim 1, wherein said gas fired water heater further comprises a flue vertically disposed above said gas burner and arranged to become heated by hot combustion products from said gas burner, and said hot water outlet pipe comprises a coil mounted externally of said flue in heat exchange relation therewith.

3. A solar water heater according to claim 1, wherein said flow control valve is connected to a first conduit branching off said hot water outlet pipe upstream of said burner and a second conduit which is connected to said hot water oulet pipe downstream of said coil, whereby, when water flows through said hot water outlet pipe, it also flows in sequence through said first conduit, said flow control valve and said second conduit to cause said flow control valve to open.

4. A solar water heater according to claim 1, wherein said thermostatically controlled valve is located in said gas supply line upstream of said flow control valve.

5. A solar water heater according to claim 1, wherein said thermostat is arranged to cause said thermostatically controlled valve to open at or below a predetermined minimum temperature in the range of about 45° to 55° C., and to close at least partially at a predetermined maximum temperature in the range of about 55° to 65° C.

* * * * *